United States Patent
Alexander et al.

(10) Patent No.: US 10,007,525 B2
(45) Date of Patent: *Jun. 26, 2018

(54) FREELIST BASED GLOBAL COMPLETION TABLE HAVING BOTH THREAD-SPECIFIC AND GLOBAL COMPLETION TABLE IDENTIFIERS

(71) Applicant: INTERNATIONAL BUSINESS MACHINES CORPORATION, Armonk, NY (US)

(72) Inventors: Gregory W. Alexander, Pflugerville, TX (US); Brian D. Barrick, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/522,821

(22) Filed: Oct. 24, 2014

(65) Prior Publication Data

US 2016/0117172 A1    Apr. 28, 2016

(51) Int. Cl.
*G06F 9/38*    (2018.01)

(52) U.S. Cl.
CPC .......... *G06F 9/3851* (2013.01); *G06F 9/3853* (2013.01); *G06F 9/3855* (2013.01); *G06F 9/3857* (2013.01)

(58) Field of Classification Search
CPC .... G06F 9/3851; G06F 9/3853; G06F 9/3855; G06F 9/3857

USPC .......................................................... 712/215
See application file for complete search history.

(56) References Cited

U.S. PATENT DOCUMENTS

| | | | |
|---|---|---|---|
| 6,721,874 B1 | 4/2004 | Le et al. | |
| 6,988,186 B2 | 1/2006 | Eickemeyer et al. | |
| 7,290,261 B2 | 10/2007 | Burky et al. | |
| 9,317,297 B2* | 4/2016 | Gottschlich | G06F 9/3851 |
| 2010/0262807 A1* | 10/2010 | Burky | G06F 9/3851 712/205 |
| 2011/0238962 A1 | 9/2011 | Cain, III et al. | |
| 2011/0302392 A1* | 12/2011 | Abernathy | G06F 9/30 712/215 |
| 2013/0007423 A1 | 1/2013 | Burcea et al. | |
| 2014/0059329 A1 | 2/2014 | Alexander et al. | |

OTHER PUBLICATIONS

IBM, "GCT Allocation Mode for Sequential GTAG Usage," IP.com No. IPCOM000012666D, May 19, 2003, 4 pages.*

(Continued)

*Primary Examiner* — Benjamin P Geib
*Assistant Examiner* — Shawn Doman
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Managing a global completion table used to track progress of groups of instructions, in which each group of instructions includes one or more instructions. Entries of the global completion table are allocated to the groups of instructions from a freelist of entries. That is, entries are allocated from a pool of entries, rather than allocating entries in-order in a circular queue.

20 Claims, 9 Drawing Sheets

(56) References Cited

OTHER PUBLICATIONS

"z/Architecture—Principles of Operation," Publication No. SA22-7832-09, $10^{th}$ Edition, Sep. 2012, 1568 pages.
Alexander, Gregory W. et al., "Freelist Based Global Completion Table," U.S. Appl. No. 14/846,892, filed Sep. 8, 2015, pp. 1-38.
List of IBM Patents of Patent Applications Treated as Related, Mar. 19, 2016, pp. 1-2.
Office Action for U.S. Appl. No. 14/846,892 dated Jan. 18, 2017, pp. 1-14.

* cited by examiner

FREELIST BASED GLOBAL COMPLETION TABLE HAVING BOTH THREAD-SPECIFIC AND GLOBAL COMPLETION TABLE IDENTIFIERS

BACKGROUND

One or more aspects relate, in general, to a global completion table, and in particular, to managing a global completion table in a multi-threaded computing environment.

A global completion table is used to track progress of instructions from dispatch through completion. Traditionally, the global completion table is managed as a circular queue, in which entries are used in order. When a group of instructions is dispatched, the group is assigned to a next sequential entry in the queue, and assigned an identifier referred to as a group tag (GTAG) or a global completion table identifier (GCT id).

The group tag is passed around as the instructions are executed. It is used to determine relative age between instructions, as well as to determine the entry in the global completion table in which to write information about the execution of the instructions.

SUMMARY

Shortcomings of the prior art are overcome and additional advantages are provided through the provision of a computer program product for facilitating management of a global completion table of a multi-threaded computing environment. The computer program product includes a storage medium readable by a processing circuit and storing instructions for execution by the processing circuit for performing a method. The method includes, for instance, obtaining, by a processor, a group of instructions to be dispatched, the group of instructions including one or more instructions and being initiated by a particular thread of the processor; assigning to the group of instructions a thread-specific identifier to be used in managing processing relating to the group of instructions; and allocating to the group of instructions an entry of the global completion table, wherein the allocating includes: selecting the entry of the global completion table from a freelist of entries; and providing a global completion table identifier to the selected entry of the global completion table.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

In accordance with one or more aspects, a facility for managing a global completion table (GCT) is provided. The global completion table is used to track progress of instructions from dispatch through completion. Traditionally, the GCT is managed as a circular queue; however, the use of a circular queue provides complexities for some environments, such as multi-threaded computing environments. Further, the global completion table may be divided into multiple circular queues which causes inefficient use of the GCT resources as each thread only has access to a subset of the GCT.

In multi-threaded computing environments, multiple threads are concurrently executing, and thus, the use of a circular global completion table requires tracking of age relationships of the instructions across threads, as well as requiring one thread to wait for another because of dispatch time. To avoid these situations, in accordance with one or more aspects, a non-circular global completion table is used. Instead of a circular queue, entries for the global completion table are assigned from a freelist, and a thread-specific entry identifier (TGTAG) is provided, as well as a standard (non-thread specific) entry id or GTAG.

Figure 1:
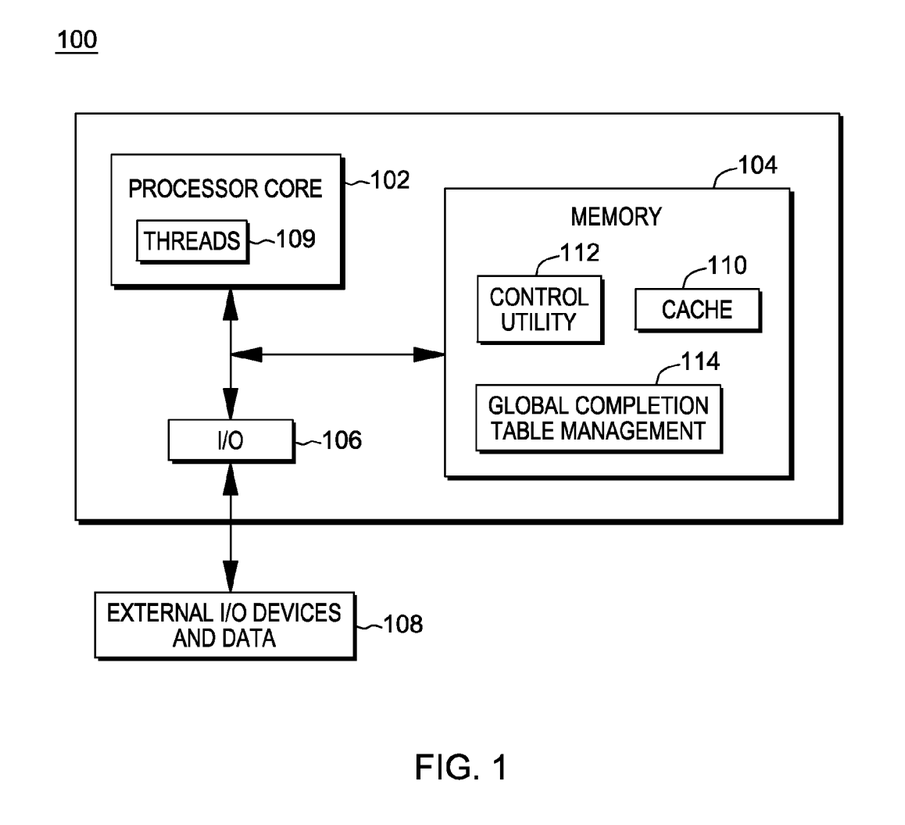
FIG. 1 depicts one embodiment of a computing environment to incorporate and use one or more aspects of a global completion table management facility.

One embodiment of a computing environment to incorporate and use one or more aspects of a global completion table management facility is described with reference to FIG. 1. Referring to FIG. 1, in one example, a computing environment 100 is based on the z/Architecture, offered by International Business Machines (IBM®) Corporation, Armonk, N.Y., and described in "z/Architecture—Principles of Operation," Publication No. SA22-7832-09, 10th Edition, September 2012, which is hereby incorporated by reference herein in its entirety.

IBM, Z/ARCHITECTURE, and Z/OS, POWER, POWER ARCHITECTURE and POWERPC (referenced below) are registered trademarks of International Business Machines Corporation, Armonk, N.Y. Other names used herein may be registered trademarks, trademarks or product names of International Business Machines Corporation or other companies.

As one example, computing environment 100 includes a processor core 102 (e.g., a physical hardware processor; also referred to herein as a processor) communicatively coupled to memory 104 and an input/output (I/O) subsystem 106. I/O subsystem 106 is further communicatively coupled to external I/O devices 108 that may include, for example, data input devices, sensors and/or output devices, such as displays.

Processor core 102 is the physical processor resources, and includes, for instance, a plurality of threads 109. Each thread is, for example, a logical central processing unit (CPU). The processor core hardware contains the full architected state (e.g., z/Architecture and micro-architected state) for each thread.

Memory 104 includes, for instance, one or more caches 110, at least one control utility 112, such as an operating system (e.g., z/OS, offered by International Business Machines Corporation, Armonk, N.Y.), and one or more aspects of a global completion table management facility 114 to be executed by the processor core to manage a global completion table in execution of instructions.

Figure 2A:
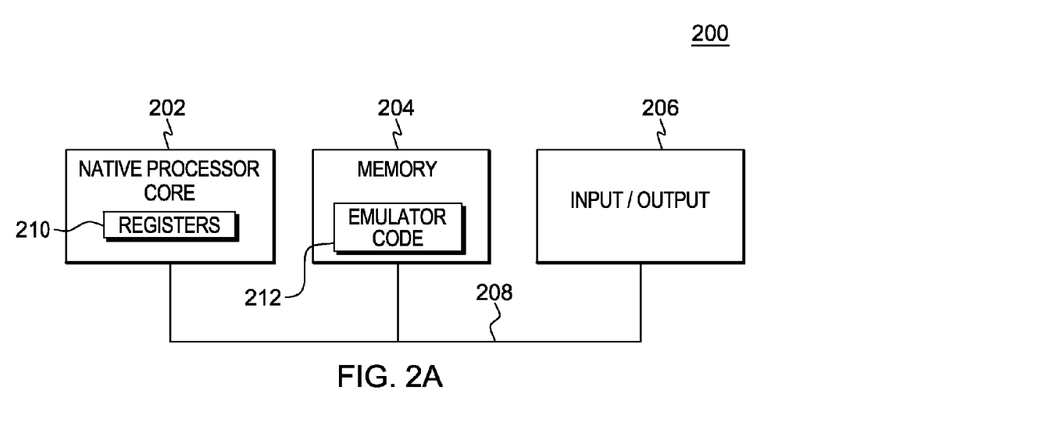
FIG. 2A depicts another embodiment of a computing environment to incorporate and use one or more aspects of a global completion table management facility.

Another embodiment of a computing environment to incorporate and use one or more aspects of a global completion table management facility is described with reference to FIG. 2A. In this example, a computing environment 200 includes, for instance, a native processor core 202, a memory 204, and one or more input/output devices and/or interfaces 206 coupled to one another via, for example, one or more buses 208 and/or other connections. As examples, computing environment 200 may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native processor core 202 includes one or more native registers 210, such as one or more general purpose registers and/or one or more special purpose registers used during processing within the environment that include information that represents the state of the environment at any particular point in time.

Moreover, native processor core 202 executes instructions and code that are stored in memory 204. In one particular example, the processor core executes emulator code 212 stored in memory 204. This code enables the computing environment configured in one architecture to emulate one or more other architectures. For instance, emulator code 212 allows machines based on architectures other than the z/Architecture, such as PowerPC processors, Power Systems servers, HP Superdome servers or others, to emulate the z/Architecture and to execute software and instructions developed based on the z/Architecture.

Figure 2B:
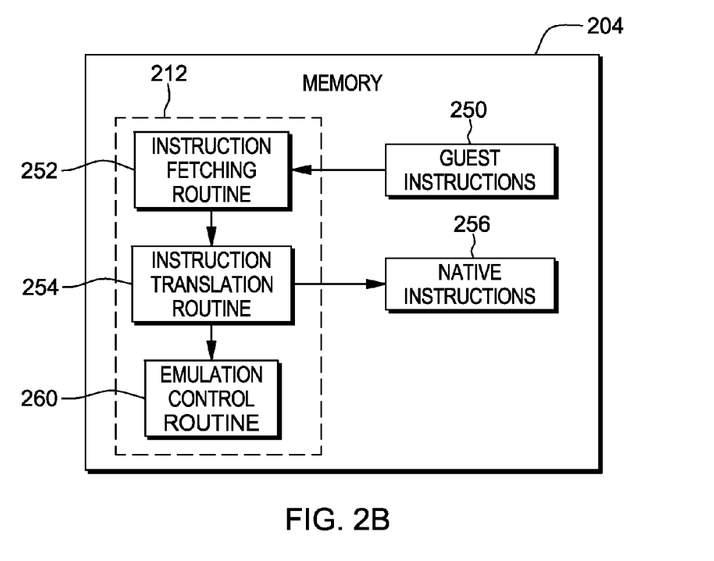
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native processor core 202. For example, guest instructions 250 may have been designed to execute on a z/Architecture processor 102, but instead, are being emulated on native processor core 202, which may be, for example, a POWER processor or an Intel Itanium II processor, as examples. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native processor core 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine. In one example, the guest instructions that are fetched and translated into native instructions may be instructions of the global completion table management facility used to manage a global completion table.

Each routine is, for instance, implemented in software, which is stored in memory and executed by native central processor core 202. In other examples, one or more of the routines or operations are implemented in firmware, hardware, software or some combination thereof. The registers of the emulated processor may be emulated using registers 210 of the native processor core or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The computing environments described above are only examples of computing environments that can be used. Other environments, including but not limited to, other non-partitioned environments, partitioned environments, and/or other emulated environments, may be used; embodiments are not limited to any one environment or to any particular architecture or system.

Figure 3:
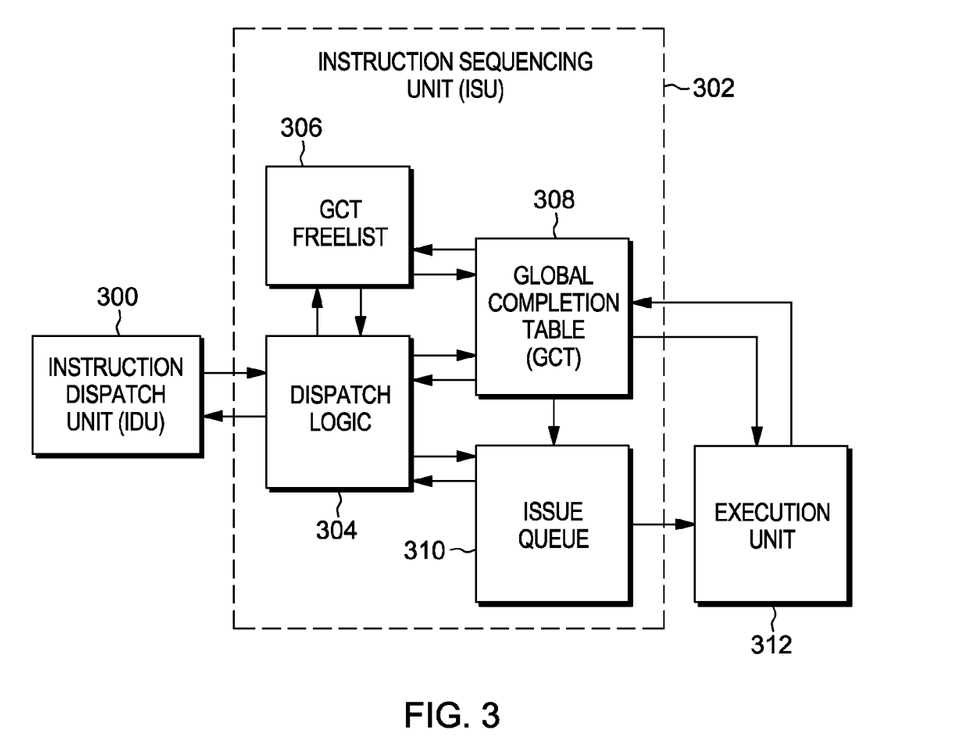
FIG. 3 depicts one example of an instruction sequencing unit including a global completion table.

One embodiment of instruction execution in a processor core, such as processor core 102, is described with reference to FIG. 3. Initially, an instruction dispatch unit (IDU) 300 of the processor core dispatches a group of instructions (e.g., one or more instructions) to an instruction sequencing unit (ISU) 302 of the processor core. The group of instructions are, in one example, initiated by a particular thread of the processor core.

In one example, instruction sequencing unit 302 includes dispatch logic 304 coupled to a global completion table (GCT) freelist 306, a global completion table 308, and an issue queue 310. Global completion table 308 and issue queue 310 are coupled to one or more execution units 312. Further, global completion table freelist 306 is also coupled to global completion table 308.

Global completion table freelist 306 includes a pool of GCT entries that are free to be allocated to groups of instructions, as well as logic for managing the pool of entries. Further, the global completion table is a data structure including entries from the freelist that are allocated to groups of instructions, as well as logic for managing the GCT.

Dispatch logic 304 of the instruction sequencing unit receives a dispatched group of instructions from instruction dispatch unit 300. Dispatch logic 304 requests and obtains a GCT entry from the GCT freelist 306 for the group of instructions being dispatched. For example, freelist 306 (e.g., logic of the freelist) selects from the freelist (or pool) a free entry of the global completion table, allocates the entry to the group of instructions, and assigns an identifier to the entry, referred to as a GTAG. The freelist provides an indication of the entry, and specifically the GTAG, to the dispatch queue of dispatch logic 304. Further, this entry from freelist 306 is added to global completion table 308.

Additionally, dispatch logic 304 assigns an identifier to the group of instructions, referred to as a thread-specific global completion table tag (TGTAG). The TGTAG along with any thread information is stored in GCT 308 to allow knowledge of the group of instructions stored in the physical location. Thus, the group of instructions has multiple identifiers associated therewith: a GTAG and a thread-specific GTAG, used as described below. The group of instructions along with the GTAG and TGTAG are placed on issue queue 310.

At the appropriate time, issue queue 310 issues the instructions to an execution unit 312, which executes the instructions. (In one embodiment, there may be multiple execution units of different types, e.g., floating point, fixed point, load/store, etc.) For instance, issue queue 310 issues one instruction at a time to a given execution unit 312, the instruction to be issued is the oldest instruction that still needs to issue and has all dependencies met. At finish, execution unit 312 updates global completion table 308. For instance, execution unit 312 sends finish information for the instructions that finish to the logic of global completion table 308. GCT 308 uses the GTAG to point to an entry in GCT 308 to store information for the instructions. The GTAG is used by execution unit(s) 312 at finish time to indicate to GCT 308 what physical entries should be used to store finished information.

Figure 4:
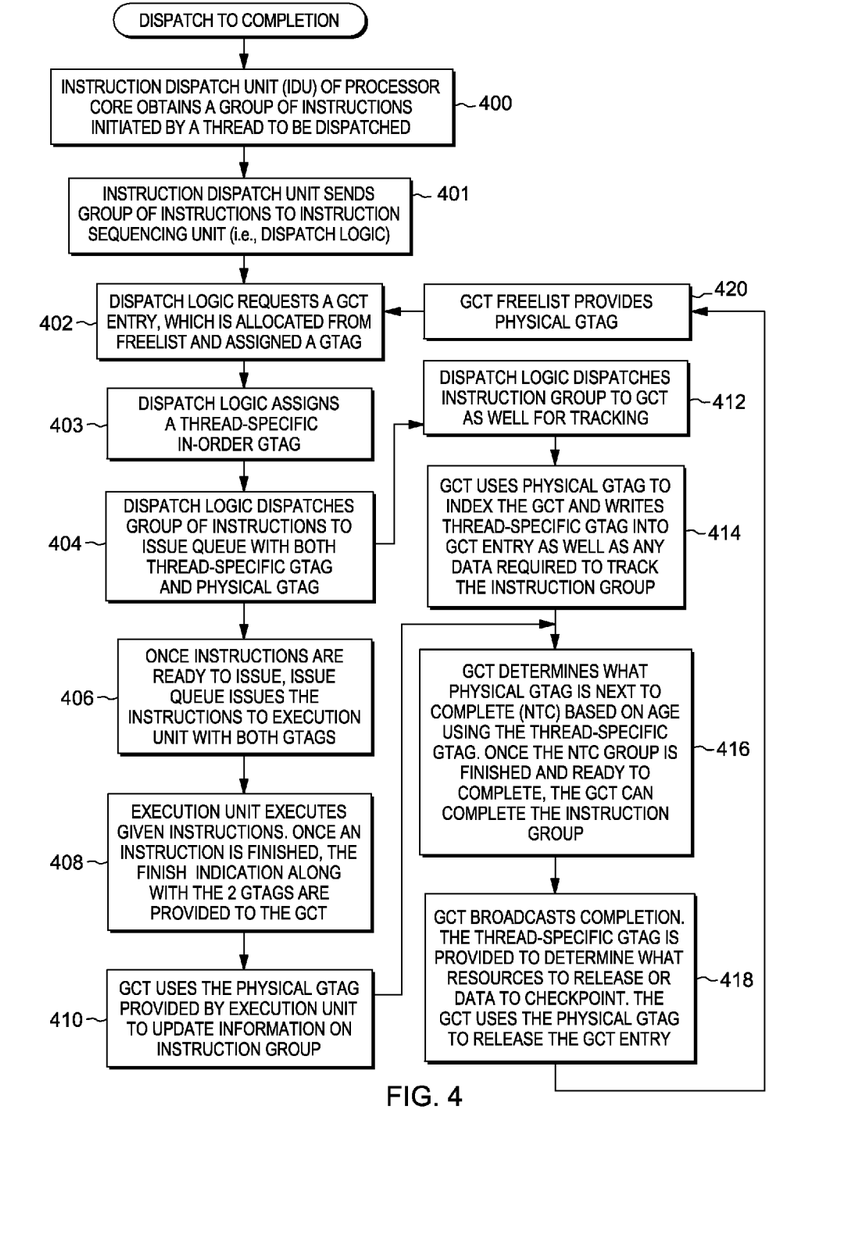
FIG. 4 depicts one embodiment of logic relating to the dispatch of a group of instructions through execution.

One embodiment of logic used in dispatch to completion of a group of instructions is described with reference to FIG. 4, and with additional reference to FIG. 3. Initially, instruction dispatch unit (IDU) 300 of the processor core obtains a group of instructions initiated by a thread and to be dispatched, STEP 400. Instruction dispatch unit 300 sends the group of instructions (referred to herein as an instruction group) to instruction sequencing unit 302, and, in particular, to dispatch logic 304 of the instruction sequencing unit, STEP 401. Dispatch logic 304 receives the instruction group and requests a GCT entry from GCT freelist 306, STEP 402. GCT freelist 306 selects an entry from the freelist of entries, allocates it to the group of instructions and assigns an identifier to the entry, referred to as a GTAG or physical GTAG. It is the identifier of the physical location in the GCT assigned to this entry and group of instructions. GCT freelist 306 provides this GTAG to dispatch logic 304, STEP 420. Further, dispatch logic 304 assigns a thread-specific in-order GTAG to the instruction group, STEP 403. For instance, the thread-specific GTAG is or includes a timestamp, which may be used to determine relative age of a group of instructions within a thread.

Dispatch logic 304 dispatches the instruction group to issue queue 310 with both the thread-specific GTAG and the physical GTAG, STEP 404. When one or more instructions are ready to be issued, issue queue 310 issues the one or more instructions to one or more execution units 312 with both the GTAG and TGTAG, STEP 406. The one or more execution units execute the one or more instructions and provide finish information for each instruction that finishes. The finish information, along with the GTAG and TGTAG, are provided to global completion table 308, STEP 408. Global completion table 308 uses the physical GTAG provided by execution unit 312 to update information in the GCT on the instruction group, STEP 410. Processing then continues to STEP 416, which is described below.

In parallel or concurrent to one or more of STEPS 404-410, dispatch logic 304 also dispatches the instruction group to GCT 308 for tracking, STEP 412. For instance, GCT 308 uses the physical GTAG to index into the GCT and writes the thread-specific GTAG into the GCT entry, as well as any data required/desired to track the instruction group, STEP 414. Processing then continues to STEP 416.

At STEP 416, GCT 308 starts completion and determines what group of instructions (physical GTAG) is next to complete based on age using the thread-specific GTAG. Once all of the instructions within the next to complete group have finished execution and have no other conditions required for completion, GCT 308 may complete the next to complete instruction group, STEP 416. For instance, GCT 308 broadcasts completion to other units (e.g., execution unit, instruction fetch unit), as well as to other logic within instruction sequencing unit 302, STEP 418. The thread-specific GTAG is provided in the broadcast to be able to determine what resources to release or data to checkpoint. Further, GCT 308 uses the physical GTAG to release the GCT entry. Processing then continues at STEP 420 in which GCT freelist 306 receives the released physical GTAG, which may be provided to dispatch logic 304 at STEP 402.

Figure 5:
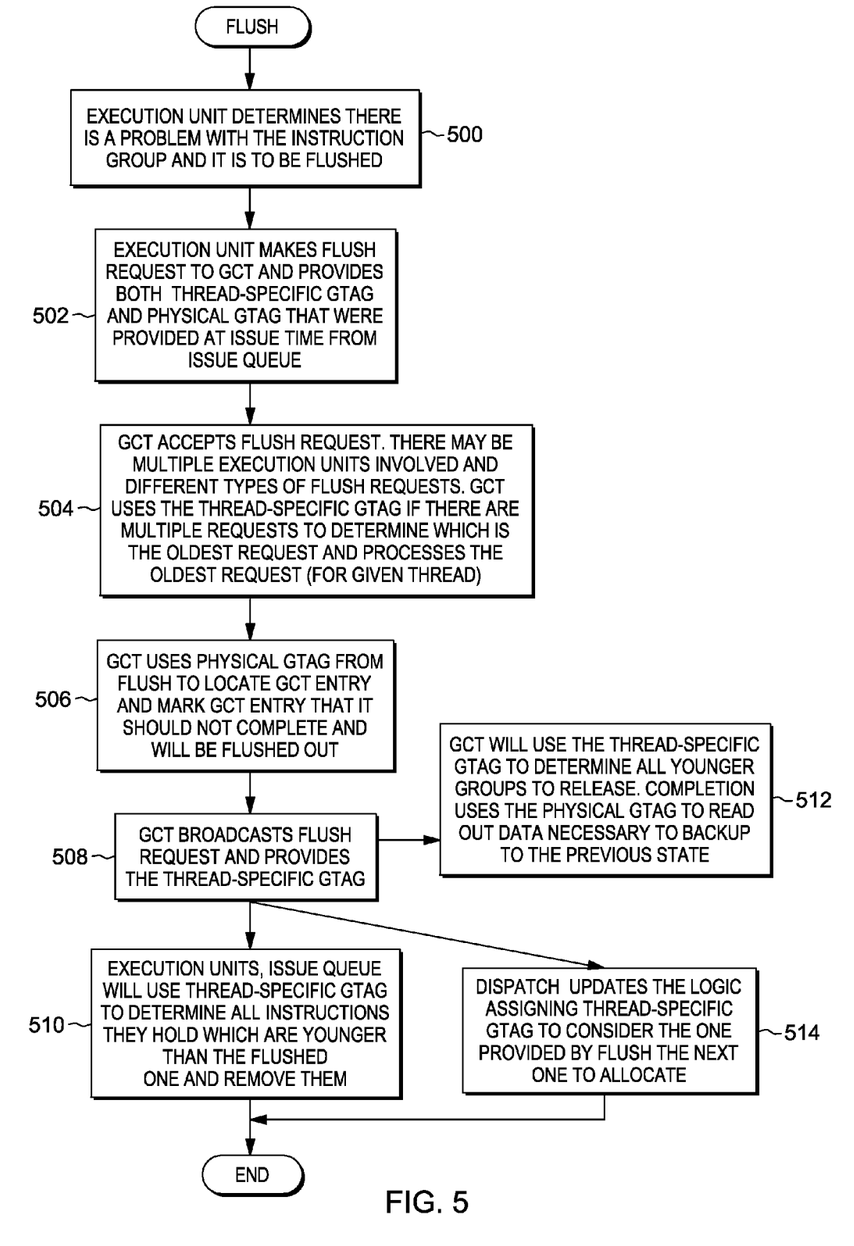
FIG. 5 depicts one embodiment of logic relating to a flush of a group of instructions.

One embodiment of logic to handle a flush is described with reference to FIG. 5, with further reference to FIG. 3. Initially, execution unit 312 determines there is a problem with one or more instructions of the instruction group and the group is to be flushed, STEP 500. This can be due to a branch wrong or some other problem with an instruction of the group. Execution unit 312 makes a flush request to global completion table 308 and provides both the thread-specific GTAG and the physical GTAG that were provided at issue time from issue queue 310, STEP 502. GCT 308 accepts the flush request, STEP 504. There may be multiple execution units 312 involved in different types of flush requests. GCT 308 uses the thread-specific GTAG if there are multiple requests to determine which is the oldest request and processes the oldest request for a given thread, STEP 504.

GCT 308 uses the physical GTAG from the flush to locate the GCT entry and mark the GCT entry that it should not complete and will be flushed out, STEP 506. Additionally, GCT 308 broadcasts the flush request to, e.g., the execution unit(s) 312 and/or issue queue 310, and provides the thread-specific GTAG, STEP 508. Execution unit(s) 312 and issue queue 310 will use the thread-specific GTAG to determine all instructions they hold which are younger than the flushed one and remove them, STEP 510.

Additionally, GCT 308 uses the thread-specific GTAG to determine all younger groups to release, STEP 512. Completion uses the physical GTAG to read out data necessary to backup to the previous state, STEP 512. Yet further, in one embodiment, dispatch logic 304 updates the logic assigning the thread-specific GTAG to consider the one provided by flush the next one to allocate, STEP 514.

Described in detail herein is a technique for managing a global completion table. In one embodiment, a thread-specific tag (each thread has its own thread-specific tag) is provided, along with a physical GTAG (a.k.a., GCT id) that points to the physical GCT entry. When an instruction group is dispatched, the dispatch logic assigns a thread-specific GTAG to the instruction group. A freelist assigns a physical GTAG to the instruction group as well. The freelist logic tracks the GCT entries in use. At dispatch time, the dispatch logic requests a GCT entry to use for the instruction group and the freelist provides an entry that is free. The dispatch logic then dispatches the group of instructions to the issue queue and the GCT. The issue queue stores the TGTAG and GTAG to be supplied to the execution unit at issue time. The GCT uses the GTAG to point to a GCT entry to store information for the group. The thread-specific GTAG along with any thread information is stored in the GCT to allow knowledge of the group stored in the physical location. The GTAG is used by the execution units at finish time to indicate to the GCT what physical entry should be used to store finish information. In the event of a flush by the execution unit (e.g., branch wrong), the GTAG and TGTAG will both be provided.

The GCT starts completion by first tracking the next to complete (NTC) group based on the last complete TGTAG. The TGTAG stored in the GCT is used to identify which of the GCT entries represent the NTC group information. Once all instructions within the GCT entry have finished execution and have no other conditions required to complete, the NTC group can complete. Once the group has completed, the GTAG is sent to the GCT freelist to be released.

If a flush occurs, the TGTAG request for the flush is compared against the TGTAG stored within the GCT and sets a flush required indicator (e.g., bit) in the GCT if the flush TGTAG is older than the TGTAG stored in the GCT entry. Once the flush required indicator is set, the contents are removed and the GCT freelist is updated with the release information.

Figure 6:
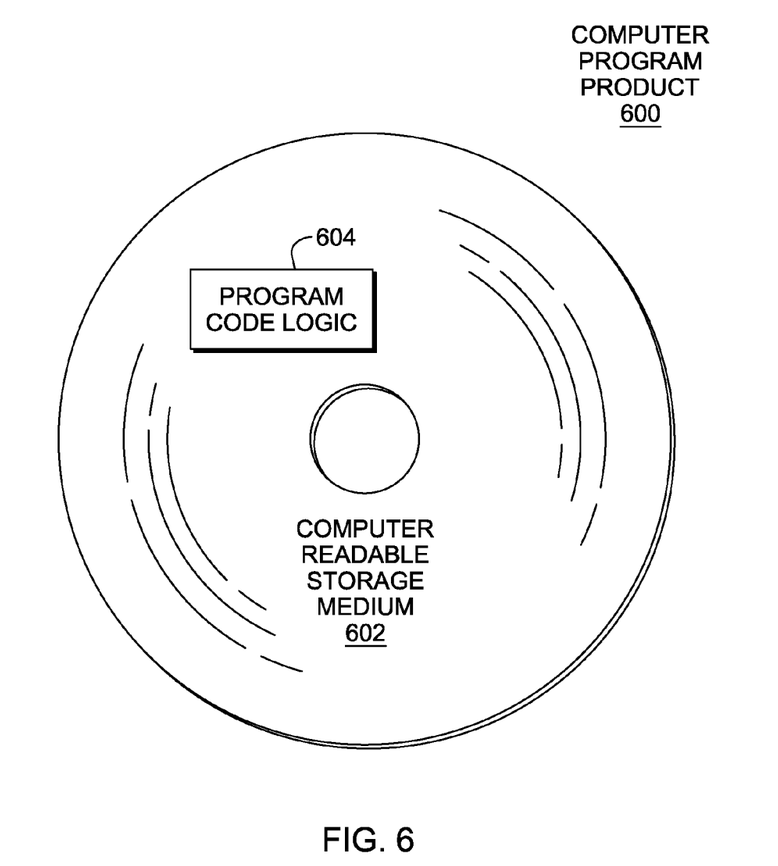
FIG. 6 depicts one embodiment of a computer program product incorporating one or more aspects.

Referring to FIG. 6, in one example, a computer program product 600 includes, for instance, one or more non-transitory computer readable storage media 602 to store computer readable program code means, logic and/or instructions 604 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, one or more aspects of the invention pertain to single-threaded environments, as well as to multi-threaded environments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 7:
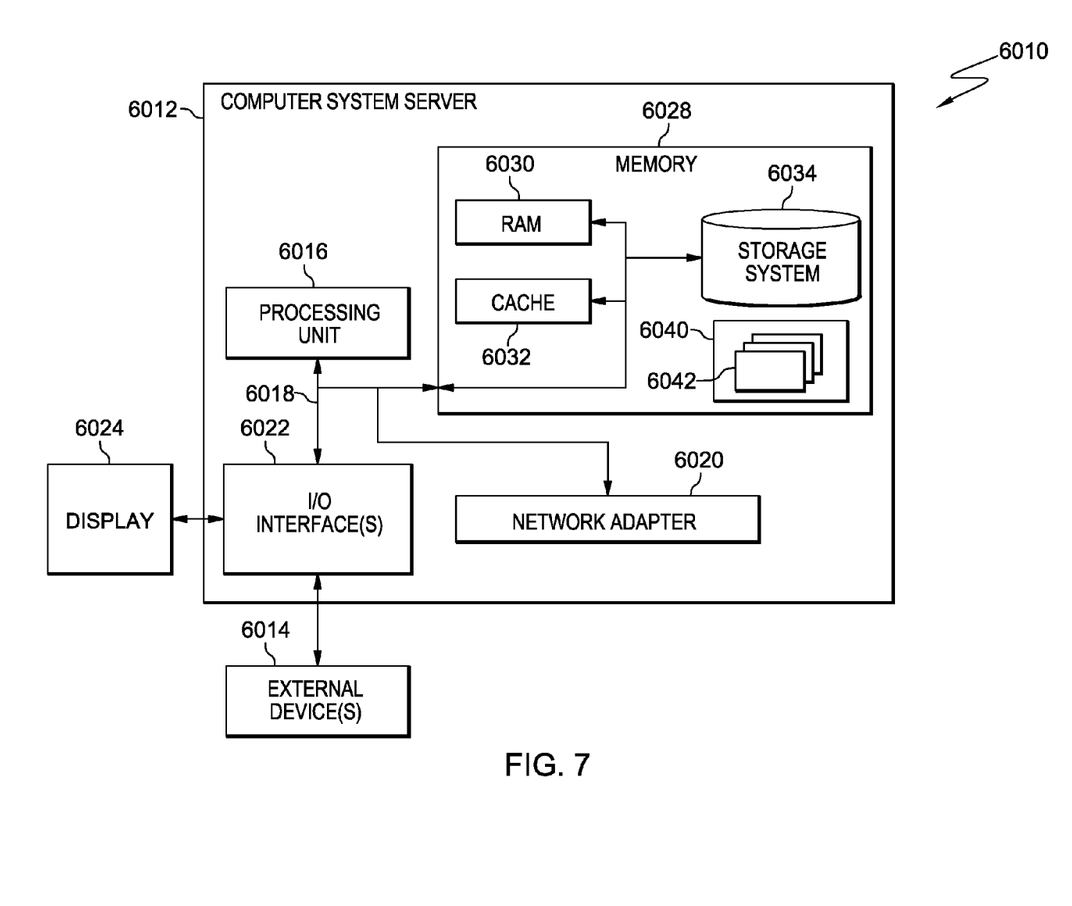
FIG. 7 depicts one embodiment of a cloud computing node.

Referring now to FIG. 7, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 8:
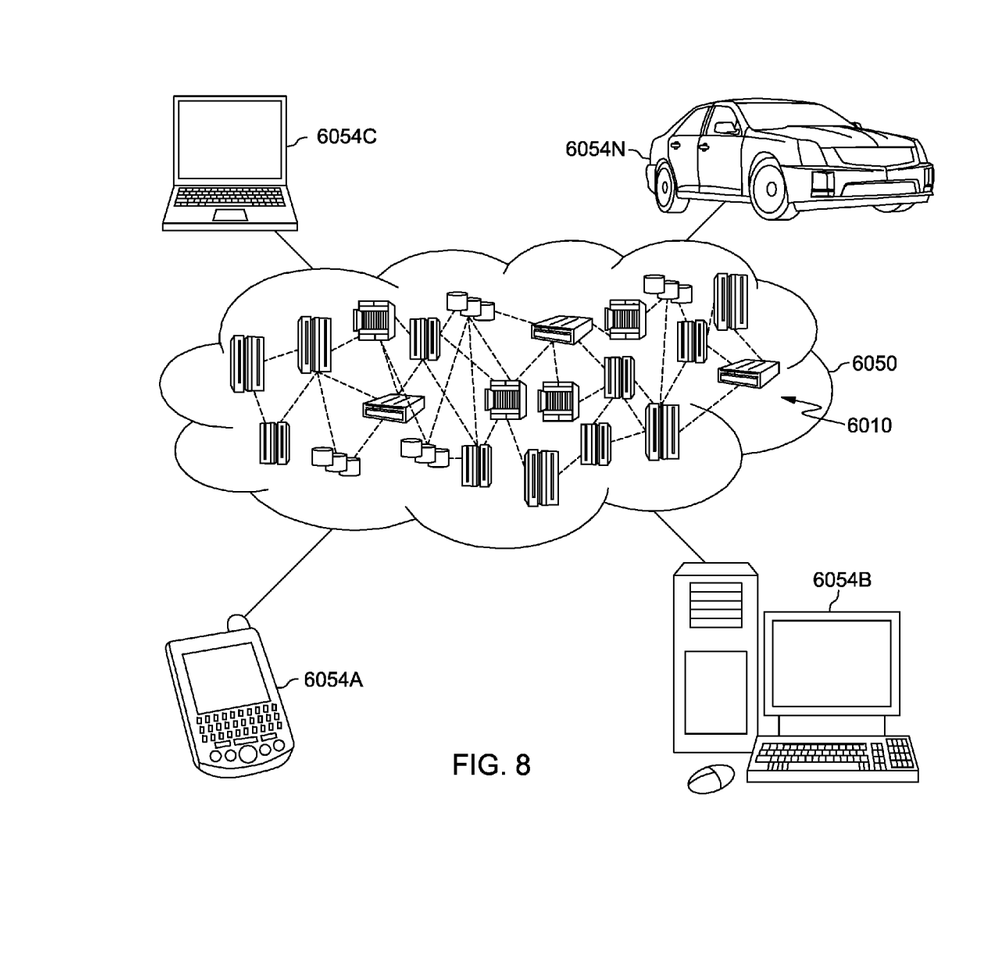
FIG. 8 depicts one embodiment of a cloud computing environment.

Referring now to FIG. 8, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 8 are intended to be illustrative only and that computing nodes 6010 and cloud computing environment 6050 can communicate with any type of computerized device over any type of network and/or network addressable connection (e.g., using a web browser).

Figure 9:
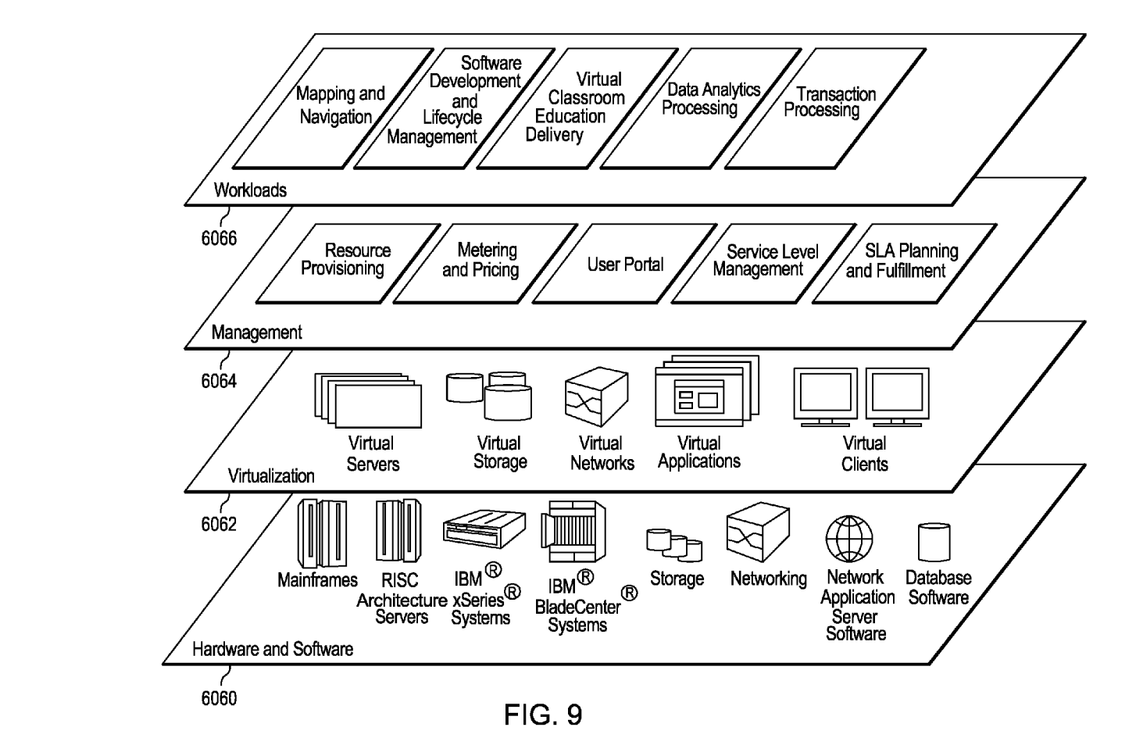
FIG. 9 depicts one example of abstraction model layers.

Referring now to FIG. 9, a set of functional abstraction layers provided by cloud computing environment 6050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating management of a global completion table of a multi-threaded computing environment, said computer program product comprising:

a computer readable storage medium readable by a processing circuit and storing instructions for execution by the processing circuit for performing a method comprising:

obtaining, by a processor, a group of instructions to be dispatched, the group of instructions including one or more instructions and being initiated by a particular thread of the processor;

assigning to the group of instructions a thread-specific identifier to be used in managing processing relating to the group of instructions, the thread-specific identifier being specific to the particular thread and including a timestamp used to determine relative age of the group of instructions within the particular thread;

allocating to the group of instructions an entry of the global completion table, the global completion table being non-circular, and wherein the allocating comprises:

selecting a free entry from a freelist of entries, the freelist of entries being coupled to, but separate, from the global completion table;

allocating the free entry to the group of instructions;

providing a global completion table identifier to the free entry, the global completion table identifier identifying a physical location within the global completion table assigned to the group of instructions; and adding the free entry to the global completion table, the free entry being the entry of the global completion table allocated to the group of instructions; and including in the global completion table the thread-specific identifier to provide knowledge of the group of instructions.

2. The computer program product of claim 1, wherein the thread-specific identifier is included in the entry of the global completion table.

3. The computer program product of claim 1, wherein the global completion table identifier is used to record progress in the entry of the global completion table of the group of instructions.

4. The computer program product of claim 1, wherein the method further comprises: based on finishing execution of an instruction of the group of instructions, providing a finish indication to the global completion table; and based on obtaining the finish indication, updating information regarding the instruction in the entry, the entry located in the global completion table using the global completion table identifier.

5. The computer program product of claim 1, wherein the including comprises:

locating the entry using the global completion table identifier; and writing the thread-specific identifier into the entry.

6. The computer program product of claim 1, wherein the method further comprises determining a next global completion table identifier of a next group of instructions to be completed, wherein the determining is based on age and uses thread-specific identifiers of groups of instructions to determine the age.

7. The computer program product of claim 6, wherein the next group of instructions to complete completes, and the method further comprises:

using a next thread-specific identifier of the next group of instructions to complete to determine at least one of resources of the next group of instructions to complete to be released or data of the next group of instructions to complete to be checkpointed; and using the next global completion table identifier of the next group of instructions to complete to release an entry in the global completion table allocated to the next group of instructions to complete.

8. The computer program product of claim 1, wherein the method further comprises:

determining the group of instructions is to be flushed;

based on determining the group of instructions is to be flushed, locating the entry of the global completion table allocated to the group of instructions, the locating using the global completion table identifier; and marking the entry of the global completion table allocated to the group of instructions to indicate the flush.

9. The computer program product of claim 8, wherein the method further comprises:

using the thread-specific identifier to determine instructions younger in age than the group of instructions to be flushed; and removing the instructions determined younger from one of issue or execution.

10. The computer program product of claim 8, wherein the method further comprises:

using the global completion table identifier to obtain data from the entry of the global completion table allocated to the group of instructions; and employing the obtained data to back-up the group of instructions to a previous state.

11. The computer program product of claim 1, wherein the method further comprises:

using the thread-specific identifier to determine which physical location of the global completion table has instructions that are next to complete; and completing the instructions that are next to complete.

12. A computer system for facilitating management of a global completion table of a multi-threaded computing environment, said computer system comprising:

a memory; and a processor in communications with the memory, wherein the computer system is configured to perform a method, said method comprising:

obtaining a group of instructions to be dispatched, the group of instructions including one or more instructions and being initiated by a particular thread of the processor;

assigning to the group of instructions a thread-specific identifier to be used in managing processing relating to the group of instructions, the thread-specific identifier being specific to the particular thread and including a timestamp used to determine relative age of the group of instructions within the particular thread;

allocating to the group of instructions an entry of the global completion table, the global completion table being non-circular, and wherein the allocating comprises:

selecting a free entry from a freelist of entries, the freelist of entries being coupled to, but separate, from the global completion table;

allocating the free entry to the group of instructions;

providing a global completion table identifier to the free entry, the global completion table identifier identifying a physical location within the global completion table assigned to the group of instructions; and adding the free entry to the global completion table, the free entry being the entry of the global completion table allocated to the group of instructions; and including in the global completion table the thread-specific identifier to provide knowledge of the group of instructions.

13. The computer system of claim 12, wherein the thread-specific identifier is included in the entry of the global completion table.

14. The computer system of claim 12, wherein the including further comprises:

locating the entry using the global completion table identifier; and writing the thread-specific identifier into the entry.

15. The computer system of claim 12, wherein the method further comprises determining a next global completion table identifier of a next group of instructions to be completed, wherein the determining is based on age and uses thread-specific identifiers of groups of instructions to determine the age.

16. The computer system of claim 15, wherein the next group of instructions to complete completes, and the method further comprises:

using a next thread-specific identifier of the next group of instructions to complete to determine at least one of resources of the next group of instructions to complete to be released or data of the next group of instructions to complete to be checkpointed; and using the next global completion table identifier of the next group of instructions to complete to release an entry in the global completion table allocated to the next group of instructions to complete.

17. The computer system of claim 12, wherein the method further comprises:

determining the group of instructions is to be flushed;

based on determining the group of instructions is to be flushed, locating the entry of the global completion table allocated to the group of instructions, the locating using the global completion table identifier; and marking the entry of the global completion table allocated to the group of instructions to indicate the flush.

18. The computer system of claim 17, wherein the method further comprises:

using the thread-specific identifier to determine instructions younger in age than the group of instructions to be flushed; and removing the instructions determined younger from one of issue or execution.

19. The computer system of claim 17, wherein the method further comprises:

using the global completion table identifier to obtain data from the entry of the global completion table allocated to the group of instructions; and employing the obtained data to back-up the group of instructions to a previous state.

20. The computer system of claim 12, wherein the method further comprises: based on finishing execution of an instruction of the group of instructions, providing a finish indication to the global completion table; and based on obtaining the finish indication, updating information regarding the instruction in the entry, the entry located in the global completion table using the global completion table identifier.

* * * * *